United States Patent [19]

Wikström

[11] Patent Number: 4,811,227

[45] Date of Patent: Mar. 7, 1989

[54] METHOD FOR FINE POSITIONING VEHICLES IN EXACT RELATIONSHIPS TO GEOGRAPHIC REFERENCE MARKINGS

[76] Inventor: Sigvard Wikström, Videstigen 4, S-931 43 Skellefteå, Sweden

[21] Appl. No.: 918,315

[22] Filed: Oct. 14, 1986

[30] Foreign Application Priority Data

Oct. 15, 1985 [SE] Sweden .................................. 8504775

[51] Int. Cl.$^4$ ........................ G05B 19/19; G05D 1/02
[52] U.S. Cl. ................. 364/424.02; 180/168; 358/103
[58] Field of Search ................ 364/424, 443; 180/167, 180/168, 169; 358/103

[56] References Cited

U.S. PATENT DOCUMENTS

| | | | |
|---|---|---|---|
| 3,746,112 | 7/1973 | Ilon | 180/6.2 |
| 4,278,142 | 7/1981 | Kono | 180/168 |
| 4,307,791 | 12/1981 | De Bruine | 180/168 |
| 4,309,758 | 1/1982 | Halsall et al. | 180/169 X |
| 4,344,498 | 8/1982 | Lindfors | 180/168 |
| 4,345,662 | 8/1982 | Deplante | 180/168 |
| 4,530,057 | 7/1985 | Ahlbom | 364/424 |
| 4,556,940 | 12/1985 | Katoo et al. | 364/424 |
| 4,566,032 | 1/1986 | Hirooka et al. | 358/103 |
| 4,593,238 | 6/1986 | Yamamoto | 318/587 |

FOREIGN PATENT DOCUMENTS

| | | |
|---|---|---|
| 423839 | 6/1982 | Sweden . |
| 423840 | 6/1982 | Sweden . |
| 2143969 | 2/1985 | United Kingdom . |

Primary Examiner—Parshotam S. Lall
Assistant Examiner—Thomas G. Black
Attorney, Agent, or Firm—Foley & Lardner, Schwartz, Jeffery, Schwaab, Mack, Blumenthal & Evans

[57] ABSTRACT

The present invention relates to a method for fine positioning vehicles in exact relationships to geographic reference markings, whereby the vehicle (1) is adapted to fetch and deliver loads (2) preferably goods carried on loading stools or pallets, at fetching and delivering points (3-14), whereby it is required that the vehicle (1) repeatedly may be brought to exact positions relative to said fetching and delivering points (3-14) and whereby the vehicle (1) has at least one indicating and calculating device (24) for indicating the distance between two non-parallel lines (39-40) of the geographic reference markings (36) for calculating whether the vehicle (1) is on one side or the other of a certain relationship to a predetermined line (33 and/or 34) of direction of movement by indicating whether the distance measures between said lines (39, 40) of the reference marking is greater or smaller than the distance representing said certain relationship to the predetermined line (33 and/or 34) of direction of movement. In order to reach a quick fine positioning, the method is characterized by the fact that the vehicle (1), which by comprising separately operable driving wheels (15-18) with inclined ground contact means (19) is movable in optional directions by activating each driving wheel (15-18), is operated to drive in sideways direction (A or B) directly to the predetermined relationship to the predetermined line (33 and/or 34) of direction of movement and on the fetching and delivering point to an exact fetching and delivering position if the indcating and calculating device (24) indicates and calculates that the vehicle (1) is in relationships deviating from its predetermined relationship to the predetermined line (33 and/or 34) of direction of movement and on the fetching and delivering point in positions departing from the fetching and delivering position (FIG. 3).

16 Claims, 7 Drawing Sheets

METHOD FOR FINE POSITIONING VEHICLES IN EXACT RELATIONSHIPS TO GEOGRAPHIC REFERENCE MARKINGS

The present invention relates to a method for fine positioning vehicles in exact relationships to geographic reference markings, whereby the vehicle is adapted to fetch and deliver loads, preferably goods carried on loading stools or pallets, at fetching and delivering points. It is required that the vehicle repeatedly be brought to exact positions relative to the fetching and delivering points. The vehicle has at least one indicating and calculating device for indicating the distance between two non-parallel lines of the geographic reference markings and for calculating whether the vehicle is on one side or the other of a certain relationship to a predetermined line along the direction of vehicle movement. The device monitors or indicates whether the distance measured between the lines of the reference markings is greater or smaller than the distance representing a certain relationship to the predetermined line of direction of movement.

It is commonly known from several publications e.g. SE public specification No. 8006905-7 (publ. No. 423 839) and SE public specification 8006906-5 (publ. No. 423 840), GB publication No. 2 143 969 A and U.S. Pat. No. 4,278,142, to control vehicle movement along predetermined paths to predetermined positions by indicating the position of reference markings. The methods and vehicles of these publications do not permit control of the vehicles straight back to the correct path and/or position if they depart therefrom. Instead, they must drive a relatively long distance back in order to return to the correct path.

The object of the present invention is to eliminate this problem and provide a method which substantially increases the possibilities of a quick and safe fine positioning. This, is arrived at according to the invention by means of the features of the invention.

The invention will be further described below with reference to the accompanying drawings, in which FIG. 1, with a perspective view from below, illustrates a vehicle for transporting goods on loading stools or pallets;

Figure 1:
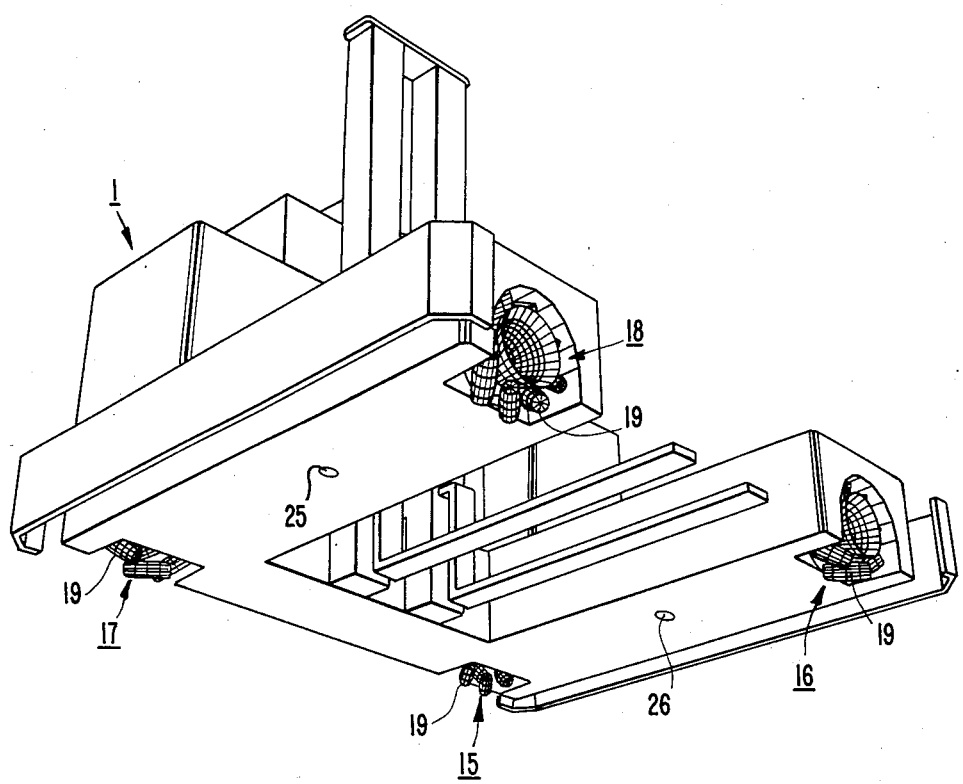
Figure 2:
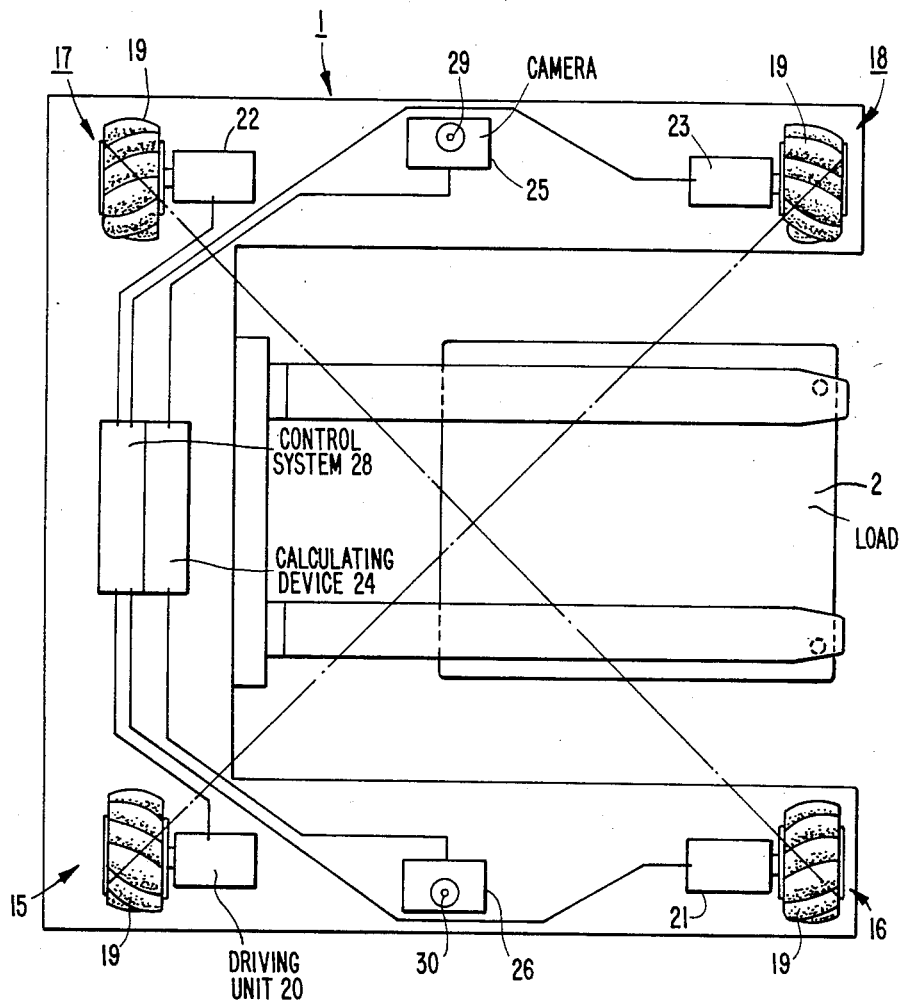
FIG. 2 is a schematic bottom plan view of the vehicle of FIG. 1.
Figure 3:
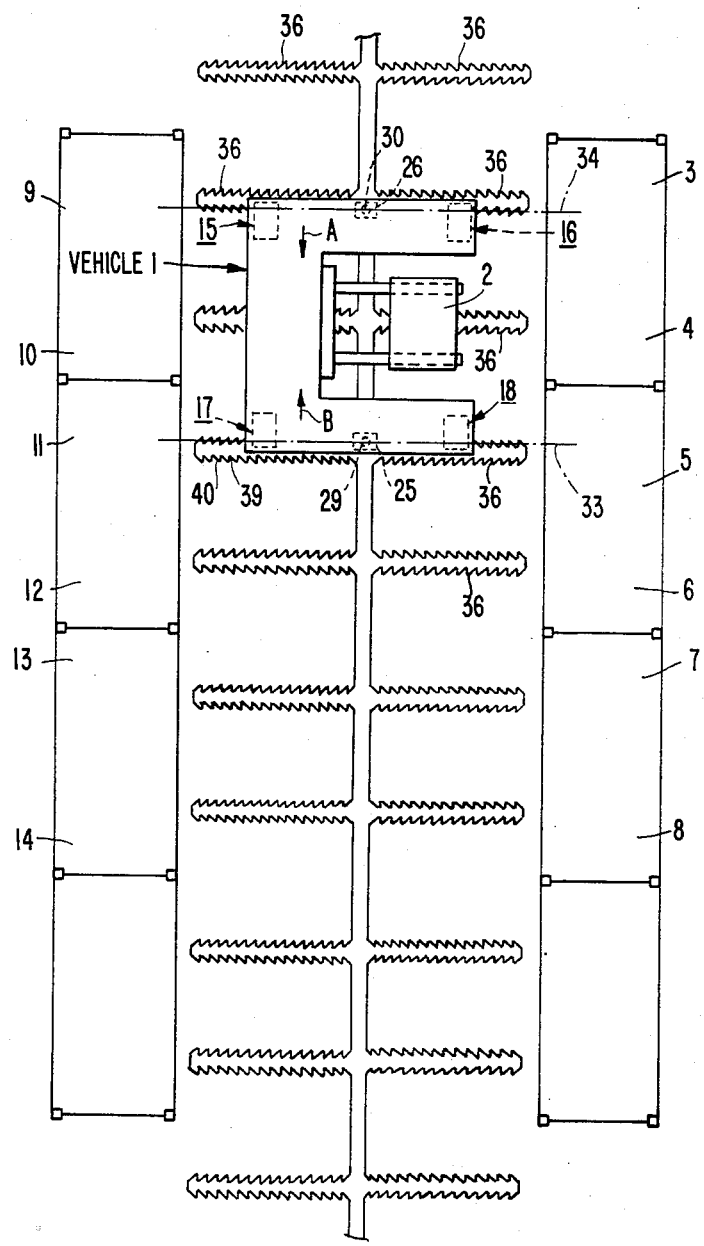
FIG. 3 is a schematic top plan view of the vehicle when driving after reference markings.

The vehicle 1 shown in the drawings is a fork lift truck adapted to fetch and deliver loads 2, preferably goods carried on loading stools or pallets, at fetching and delivering points 3-14 in a storage building. The fork lift truck has four separately driven driving wheels 15, 16, 17 and 18 with ground contact means 19 inclined in such a manner that the vehicle is movable in optional directions by driving said wheels 15-18 separately by means of driving units 20-23, with the same speed, with various speeds, in the same direction, in various directions or combinations thereof, depending on in which direction you want to drive. The driving of the driving wheels 15-18 and their function for driving the fork lift truck in various directions is more clearly defined in U.S. Pat. No. 3,746,112.

The fork lift truck 1 also has an monitoring and calculating device 24 comprising two cameras 25, 26 of e.g. CCD-type, ITV-type or another suitable type for indicating reference markings.

The indications determined by the cameras 25, 26 are transformed into suitable signals which are fed into a suitable calculating device 27 which cooperates with a control system 28 for operating the driving units 20-23 of the driving wheels 15-18 to drive the vehicle in dependence of the indications determined.

The calculating device of the monitoring and calculating device 24 and its cooperation with the control system 28 is well known, as are the cameras 25, 26, and therefore, not further described.

The cameras 25, 26 are adapted to provide an image of a certain distance corresponding to the distance between two lines of the reference markings and as a reference point 29, 30 for each camera 25, 26, the center of this distance may be chosen.

The fork lift truck 1 is adapted to be driven repeatedly to the fetching and delivering points 3-14 and brought to exact positions in relation thereto, such that the load 2 may be delivered to the exact right point and fetched therefrom on another occasion. In order to ensure that the fork lift truck 1 moves in paths to exact positions, reference markings are provided on the floor. The cameras 25, 26 are adapted to indicate if the fork lift truck 1 moves along predetermined imaginary lines 32, 33 and 34 of direction along the movement for positioning in exact fetching and delivering positions at which the reference points 29, 30 for the cameras 25, 26 are in an exact position relative to the reference markings.

Figure 4:
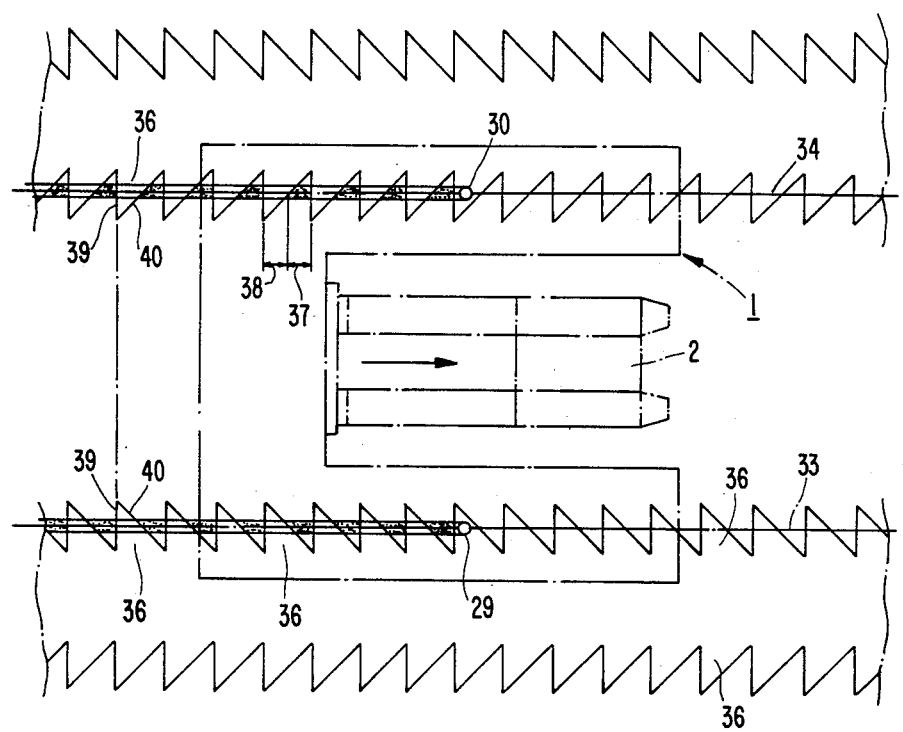
FIG. 4 illustrates the vehicle when in a correct path relative to reference markings.
Figure 5:
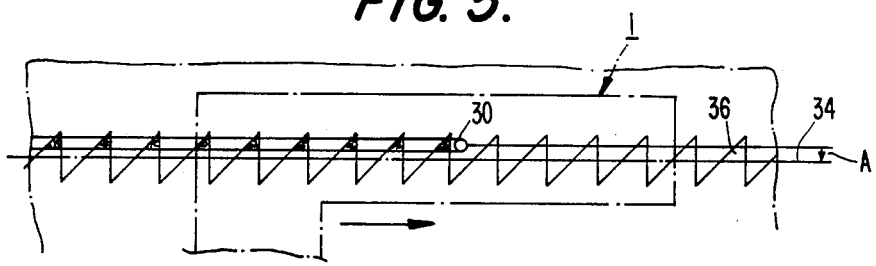
FIG. 5 illustrates a part of the vehicle when in a wrong path relative to reference markings.
Figure 6:
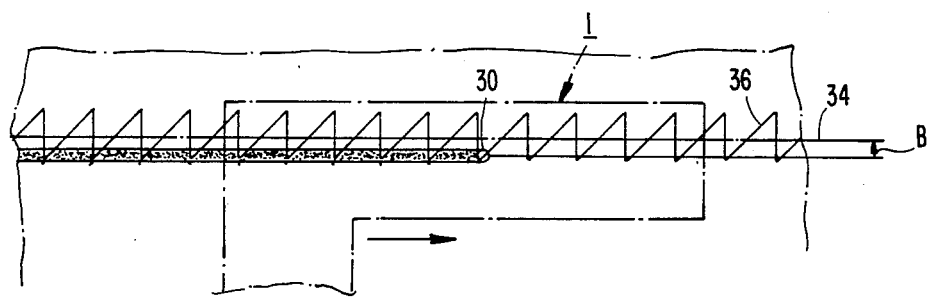
FIG. 6 illustrates a part of the vehicle when in another wrong path relative to reference markings.

For delivering load 2 at e.g. the etching and delivering point 4, the fork lift truck 1 is controlled first to follow the line 32 of direction of movement (sensing of this line and positioning in relation thereto may be carried out by means of a camera not shown) to a marking 35 provided to state that the fort lift truck 1 shall move along the lines 33 and 34 along direction of movement towards its exact fetching and delivering position. The lines 33, 34 of direction of movement are provided to extend centrally over triangular geographic reference markings 36, here in the form of bright fields obtained by painting the floor with white colour or providing it with a white plastic strip. When the reference points 29, 30 move exactly above the lines 33, 34 of direction of movement, the cameras 25, 26 indicate that the white fields 37, as the reference points pass over the "white" triangles 36, are equally large as when they pass over the "black" fields 38 between the triangles 36. This means that the fork lift truck 1 moves in an exactly correct path along the lines 33, 34 of direction of movement (FIG. 4). If the fork lift truck 1 departs from this path as is shown in FIG. 5, the cameras 25, 26 indicate that the white fields 37 become much longer than the black fields 38. A signal representing the departure is generated and fed to the calculating device 27, which calculates the magnitude of the signals received and orders the control system 28 to operate the driving units 20-23 of the driving wheels 15-18 such that said wheels rotate to move the fork lift truck 1 sideways (arrow A) directly to a position in which its reference points 29, 30 once again move exactly above the lines 33, 34 of direction of movement at continued driving towards the fetching and delivering point 4. If the fork lift truck 1 departs from its path in the other direction as is shown in FIG. 6, short white fields 37 and long black fields 38 are obtained instead and the truck is corrected directly sideways (arrow B) but in opposite direction until it once again moves along the predetermined path.

Figure 7:
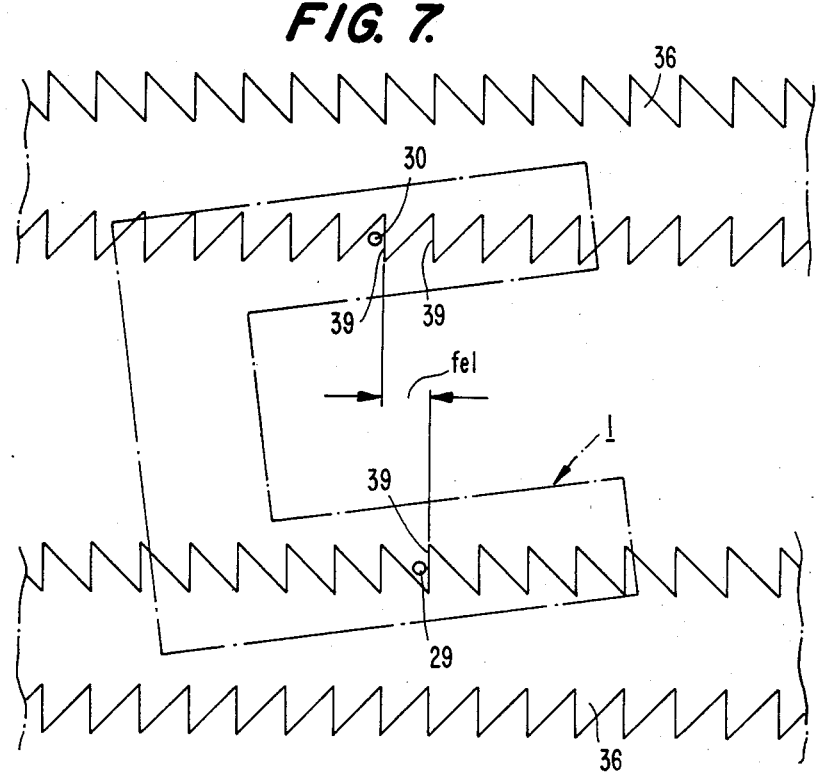
FIG. 7 illustrates the vehicle when inclined relative to reference markings.

The base 39 of the triangular reference markings 36 intersects the lines 33, 34 of direction of movement at an angle of 90°, while the hypotenuse 40 extends obliquely through said lines 33, 34. In order to ensure that the fork lift truck 1 moves standing straight and not inclined (FIG. 7) along its paths, the bases of the reference markings 36 in one direction of movement 33 have been arranged extending parallel to and in the extension of each other (marked with line F in FIG. 4). By up-dating it can be determined if the reference points 29, 30 are at the "wrong" base 39 (see FIG. 7). A signal is generated to rotate the fork lift truck 1 a value R to "straight position". When the reference points 29, 30 of the cameras 25, 26 and thus, of the fork lift truck 1, are in an exact predetermined position relative to one or more of the reference markings 36, the exact fetching and delivering position at point 4 has been reached.

If the reference points do not immediately reach these positions, the fork lift truck 1 is moved directly sideways such that the positions are reached. This occurs very quickly and without the fort lift truck needing to move so that the reference points 29, 30 must move out of the triangular reference markings 36.

In FIGS. 4-7 it is shown that the triangular reference markings 36 are provided in two rows and in connection to each other (or almost in connection relative to each other). Hereby, a continuous fine positioning is obtained during the movement or travel of the fork lift truck 1 towards the fetching and delivering point 4.

Figure 8:
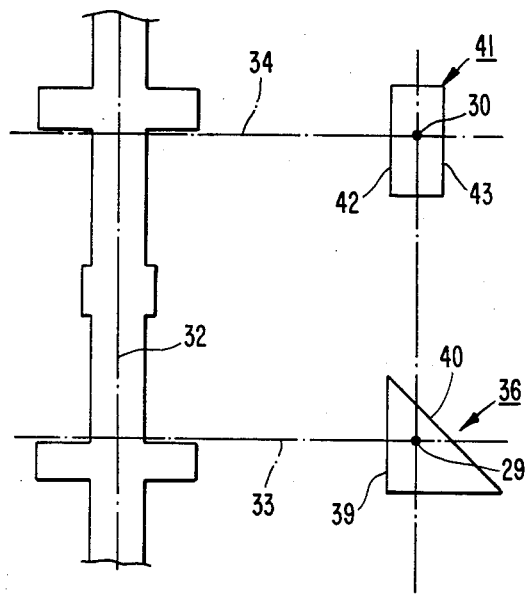
FIG. 8 illustrates another type of reference markings.
Figure 9:
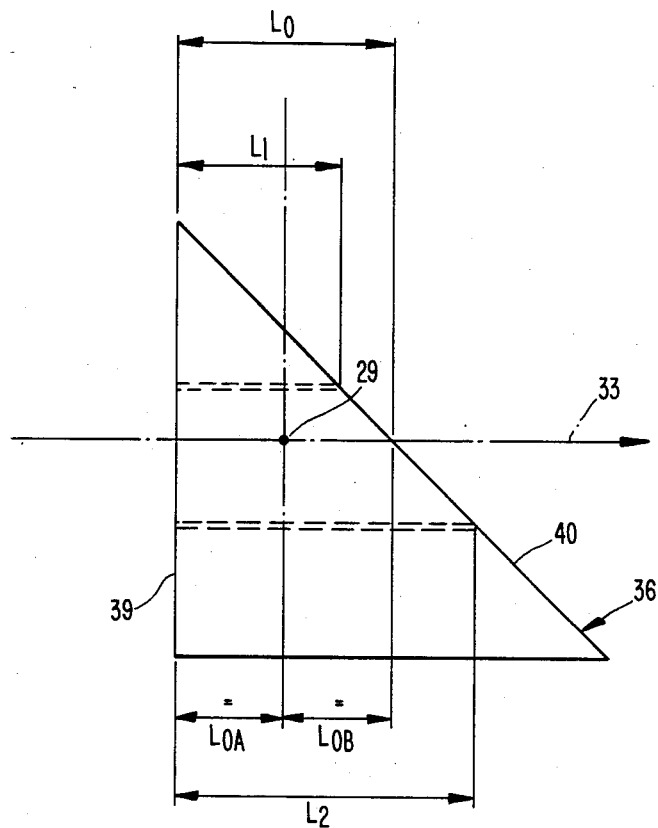
FIG. 9 is an enlargement of the reference markings of FIG. 8.

As is shown in FIG. 8, the fork lift truck 1 may also be controlled by a so called "dead counting". In this case one (or more after each other) triangular reference marking 36 is provided on one line 33 of direction of movement (eventually also on line 34 of direction of movement). If the fork lift truck 1 is in a position in which the reference point 29 is situated on the line 33 of direction of movement, the distance between the base 39 and the hypotenuse 40 has e.g. the value $L_O$ and when the value $L_{OA}=L_{OB}$, the reference point 29 is situated half-way between the base and the hypotenuse on line 33 and thus, e.g. in exact correct fetching and delivering position. However, if a distance less than $L_O$ (e.g. $L_1$) is indicated, the fork lift truck 1 is in a wrong position and guided side-ways in the direction of arrow A to the correct position. If a distance greater than $L_O$ (e.g. $L_2$) is indicated, the fork lift truck 1 is situated wrong in the other direction and guided sideways in the direction of arrow B to the correct position.

In the latter case, a reference marking associated with the triangular reference marking 36 may be rectangular (reference marking 41, see FIG. 8), whereby one side 42 thereof extends parallel to the base 39 and in its extension. If so, the rectangular reference marking 41 has the same distance between the line 42 and the opposite line 43 as the distance $L_O$ in the associated triangular reference marking 36. Here, the reference point 30 is situated in its fetching and delivering position when it is located half-way between the lines 42 and 43.

Figure 10:
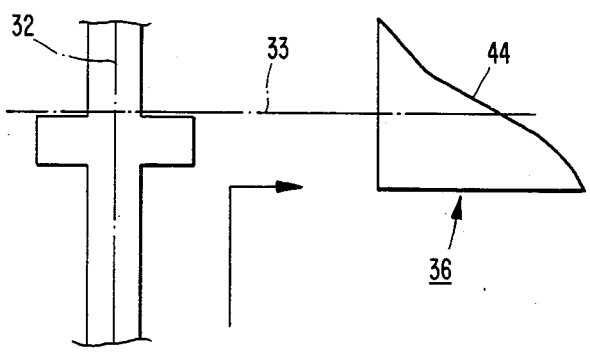
FIG. 10 illustrates a further alternative type of reference marking.

Thus, the triangular reference markings 36 may be located beside each other or at a distance from each other and the inclination of the hypotenuse 40 or portion 44 thereof (see FIG. 10) relative to the lines 33 and/or 34 of direction of movement may be adapted to determine the precision of the indication.

Indication can be made by measuring the amount of light or in any other way in order to determine the distance between the lines 39 and 40 of the reference markings 36. Fine positioning directly sideways includes not only 90° sideway directions relative to the lines of direction of movement, but also directions laterally inclined relative to the lines of direction of movement. It is essential that the fork lift truck 1 must only be driven to such a relationship that its reference points 29, 30 are situated above the reference marking 36, so that fine positioning occurs without moving the truck long distances back and forth relative to the reference marking.

It is not necessary that the reference points 29, 30 move exactly above the lines 33, 34 of direction of movement when the truck 1 is in "correct position" but may move in another predetermined relationship thereto and be adapted to be situated in another predetermined relationship to the reference markings when said truck is in its fetching and delivering position that what is described above.

The lines 39, 40 between which the distance is indicated, do not need to be sides in a triangle, but the only requirement is that these lines be non-parallel and preferably linear.

Of course, other types of vehicles than fork lift trucks may be used in connection with the present method according to the invention.

I claim:

1. Method for fine positioning of a vehicle in exact relationships to geographic reference markings, the vehicle (1) fetching and delivering loads (2), preferably goods carried on loading stools or pallets, at fetching and delivering points (3-14), the vehicle further being repeatedly brought to exact positions relative to said fetching and delivering points (3-14) and whereby the vehicle (1) has at least one indicating and calculating device (24) for indicating the distance between two non-parallel lines (39, 40) of the geographic reference markings (36) and for calculating vehicle (1) position relative to a predetermined line (33 and/or 34) of direction of movement by indicating whether the distance measured between said non-parallel lines (39, 40) of the reference marking is greater or smaller than the distance representing said predetermined relationship to the predetermined line (33 and/or 34) of direction of movement, the method comprising the steps of operating the vehicle (1), by separately operable driving wheels (15-18) with inclined ground contact means (19) movable in any direction to activate each driving wheel (15-18), to drive in a direction sideways to the direction of movement (A or B) to achieve the predetermined relationship to the predetermined line (33 and/or 34) of direction of movement and to an exact fetching and delivering position when the monitoring and calculating device (24) calculates that the vehicle (1) is in relationships deviating from its predetermined relationship to the predetermined line (33 and/or 34) of direction of movement and departs from the fetching and delivering position.

2. Method according to claim 1, comprising (a) operating the vehicle to drive in a direction (A or B) sideways to the direction of movement to achieve directly the predetermined relationship to the predetermined line (33 and/or 34) of direction of movement, the line extending through at least one triangular reference marking (36), and wherein a base (39) and a hypotenuse (40) of the triangle define the two non-parallel lines; and (b) monitoring and calculating the mutual distance, between the non-parallel lines and wherein the predetermined line of direction of movement extends perpendicularly to said base (39) and passes through said hypotenuse (40).

3. Method according to claim 2, comprising driving the vehicle (1) to move in a direction (A or B) sideways to the direction of movement to achieve directly a fetching and delivering position on the line (33) of direction of movement in the triangular reference marking (36) the line intersecting a base (39) and a hypotenuse (40) at about a half-way point thereof.

4. Method according to claim 2 comprising driving the vehicle (1) to move in a direction (A or B) sideways to the direction of movement to achieve directly the predetermined relationship to the predetermined line (33 and/or 34) of direction of movement, the line extending through a row of triangular reference markings located at least close to each other.

5. Method according to claim 4, comprising (a) operating the vehicle (1) to drive in a direction (A or B) sideways to the direction of movement to achieve directly the predetermined relationship to the predetermined line (33) of direction of movement, the line extending parallel to and at a distance from a second line (34) of direction of movement also extending through a row of, triangular reference markings (36), the reference markings (36) for both lines of direction of movement having bases (39) extending perpendicular to said lines, the base of each reference marking in one line of direction of movement being parallel to the base (39) of one of the reference markings (36) in the second line of direction of movement (b) monitoring and calculating the position of these bases (39), and (c) rotating the vehicle to resume a position parallel to the lines of direction of movement when the vehicle departs from this position during movement.

6. Method according to claim 2, comprising operating the vehicle (1) to drive along two lines (33 and 34) of direction of movement extending parallel to each other one line (33) running through triangular reference markings (36) and the other through rectangular reference markings (41), the base (39) of each triangular reference marking extending parallel to and along an extension of one side of a rectangular reference marking.

7. The method of claim 2 wherein the first predetermined line extends through a first plurality of closely located triangular reference markings.

8. The method of claim 7 wherein a second predetermined line substantially parallel to the first predetermined line extends through a second plurality of triangular reference markings, each triangle of the second plurality of triangular reference markings having a base substantially perpendicular to the second predetermined line and parallel to the base of a corresponding triangle in the first plurality of triangular reference markings, and comprising the steps of measuring the relative positions of the bases and rotating the vehicle to resume a position parallel to the predetermined lines if the vehicle departs from this position.

9. Method according to claim 1, monitoring the reference markings by indicating the amount of light on each portion of the reference markings (36) and on spaces between said reference markings.

10. Method according to claim 1, comprising controlling the vehicle by reading reference markings (36), whereby inclination of a line (44) extending obliquely relative to lines of direction of movement determines precision of the monitoring.

11. A method for finely positioning a vehicle relative to fetching and delivering points, the vehicle being equipped with means for monitoring vehicle position relative to reference markings, means for calculating a relationship between a position of the vehicle and reference markings having non-parallel lines, and separately operable driving wheels moveable in any direction with inclined ground contact means, the method comprising the steps of:
(a) monitoring with the monitoring means a position of the vehicle along a first predetermined line along the direction of movement toward fetching and delivering points;
(b) monitoring a distance between the non-parallel lines of the reference markings with the monitoring means;
(c) calculating with the calculating means if the distance measured by the vehicle monitoring means between the non-parallel lines of the reference markings deviates from a predetermined relationship representing a desired positioning of the vehicle relative to the first predetermined line; and
(d) operating each drive wheel separately in a direction substantially sideways to the first predetermined line to move the vehicle directly to a position maintaining the predetermined relationship between the non-parallel reference markings and the first predetermined line.

12. The method of claim 11 wherein a base and a hypotenuse define two non-parallel lines of at least one triangular reference marking and the first predetermined line extends through the hypotenuse and perpendicular to the base.

13. The method of claim 12 comprising the step of moving the vehicle in a sideways direction directly to a fetching and delivering position on the first predetermined line, the first predetermined line being located substantially halfway along the base and hypotenuse of the triangular reference marking.

14. The method of claim 12 wherein a second predetermined line extends through rectangular reference markings located parallel to the triangular reference markings, one side of each rectangular reference marking extending along a line from the base of a corresponding triangular reference marking, comprising the step of positioning the vehicle relative to the first and second pluralities of reference markings.

15. The method of claim 11 comprising the step of monitoring an amount of light on each portion of the reference markings and on spaces between the reference markings.

16. The method of claim 11 comprising the step of controlling the vehicle by reading reference markings and determining precision of monitoring by measuring inclination of a line extending obliquely relative to the direction of movement.

* * * * *